Patented June 30, 1925.

1,543,787

UNITED STATES PATENT OFFICE.

OSCAR ALFRED OLSON, OF CHICAGO, ILLINOIS, ASSIGNOR TO POTENT DRY BATTERY COMPANY, OF DENVER, COLORADO.

ELECTROLYTE FOR STORAGE BATTERIES.

No Drawing.   Application filed April 26, 1922.   Serial No. 556,753.

*To all whom it may concern:*

Be it known that I, OSCAR ALFRED OLSON, a citizen of the United States, residing at Chicago, in the county of Cook and State of Illinois, have invented certain new and useful Improvements in Electrolytes for Storage Batteries, of which the following is a specification.

This invention relates to a composition of matter adapted for use as an electrolyte in storage batteries, and its principal object is to provide an electrolytic compound of a perpetually moist semi-solid consistency which in association with suitable electrodes, forms an efficient substantially dry storage battery.

It is a further object of my invention to provide an electrolyte of the above described character which during its life, requires no replenishment of any of its ingredients, which being permanently moist, retains its efficiency without the addition of water or other liquid, and which owing to the peculiar characteristics of the compound of which it is composed, has a high degree of recuperative power and low internal resistance.

These and other objects of my invention will be more clearly understood from the following detailed description of the composition and the manner in which it is prepared.

The composition consists of a mixture of water, kieselguhr, sulphuric acid, nickel ammonium sulfate, ferrous ammonium sulfate, sodium silicate and sodium chloride, and to this mixture may be added a suitable coloring matter, such as phenolphthalein ($C_{20}H_{14}O_4$).

In preparing the composition, I preferably use the above ingredients in the following proportions:

One gallon pure water;
One pound of kieselguhr;
Three quarts of sulphuric acid (1400 S. C.);
Two ounces of nickel ammonium sulfate;
Four ounces of ferrous ammonium sulfate;
One pint of a twenty-five per cent sodium silicate solution;
One-half ounce of sodium chloride; and
One-eighth of an ounce of phenolphthalein.

The water, kieselguhr, the sulfates and the coloring matter mixed together, form a soft, porous mass of an elastic or jelly-like consistency and the addition thereto of the sodium silicate and sodium chloride gives to the mass the desired degree of stiffness. The kieselguhr functions in the composition as a body forming substance in which the sulphuric acid is absorbed, and the other ingredients co-operate to increase the porosity of said body and to cause it to permanently retain its moisture.

When placed in a battery in proper contiguity to the electrodes, the composition forms an efficient electrolyte of semi-solid consistency having a high rate of charge and discharge, low internal resistance and great recuperative power. It permanently retains its moisture and will retain its efficiency during a long period of service without the addition of water or other ingredients; it may be recharged repeatedly by the same methods employed in the wet batteries at present used in the ignition systems of motor driven vehicles, and it eliminates disintegration and sulfation of the plates owing to its compactness and well balanced low sulphuric acid content.

Having thus described my improved electrolyte, I desire it understood that variations in the proportions of its ingredients may be made to suit different conditions, without departing from the spirit of the invention, and that I may avail myself of the use of equivalent substitutes for one or more of the components within the scope of the hereunto appended claims.

What I claim and desire to secure by Letters Patent is:

1. An electrolyte for storage batteries comprising kieselguhr in intermixture with water, sulphuric acid, nickel ammonium sulfate and sodium chloride.

2. An electrolyte for storage batteries comprising kieselguhr in intermixture with water, sulphuric acid, nickel ammonium sulfate, ferrous ammonium sulfate and calcium chloride.

3. An electrolyte for storage batteries comprising one pound of kieselguhr, one gallon water, three quarts of sulphuric acid, two ounces nickel ammonium sulfate, four ounces ferrous ammonium sulfate, one pint twenty-five per cent sodium silicate solution, and one half ounce of sodium chloride.

4. An electrolyte for storage batteries comprising a body of moist, semi-solid consistency containing sulfuric acid, nickel ammonium sulfate and sodium chloride.

5. An electrolyte for storage batteries comprising a body of moist, semi-solid consistency containing sulfuric acid, nickel ammonium sulfate, ferrous ammonium sulfate and sodium chloride.

6. An electrolyte for storage batteries comprising a conductive body of moist, semi-solid consistency containing nickel ammonium sulfate and sodium chloride.

7. An electrolyte for storage batteries comprising a body of moist, semi-solid consistency containing sulfuric acid, nickel ammonium sulfate, sodium chloride and phenolphthalein.

In testimony whereof I have affixed my signature.

OSCAR ALFRED OLSON.